United States Patent [19]

Gardner

[11] 4,097,094
[45] Jun. 27, 1978

[54] JOURNAL BEARING ASSEMBLY WITH FLEXIBLE SUPPORT AND VISCOUS DAMPING

[75] Inventor: Willis W. Gardner, Waukesha, Wis.

[73] Assignee: Waukesha Bearings Corporation, Waukesha, Wis.

[21] Appl. No.: 717,297

[22] Filed: Aug. 24, 1976

[51] Int. Cl.² ............................................. F16C 17/02
[52] U.S. Cl. ......................................... 308/9; 308/15; 308/26; 308/121
[58] Field of Search ............. 308/9, 26, 184 R, 184 A, 308/28, 46, 122

[56] References Cited

U.S. PATENT DOCUMENTS

| | | | |
|---|---|---|---|
| 3,738,717 | 6/1973 | Gardner | 308/122 |
| 3,980,352 | 9/1976 | Carlson | 308/26 |
| 4,027,931 | 6/1977 | Streitert | 308/26 |

*Primary Examiner*—Richard A. Bertsch
*Attorney, Agent, or Firm*—Wheeler, Morsell, House & Fuller

[57] ABSTRACT

A plurality of arcuate, vibration cushioning, spring beams are positioned in endwise relationship in the interior of an annular bearing housing to resiliently support an annular journal bearing therewithin which, in turn, rotatably supports a shaft. An annular clearance is provided between the bearing housing and the bearing elements, and oil is introduced to the clearance to provide viscous damping of vibrations.

9 Claims, 4 Drawing Figures

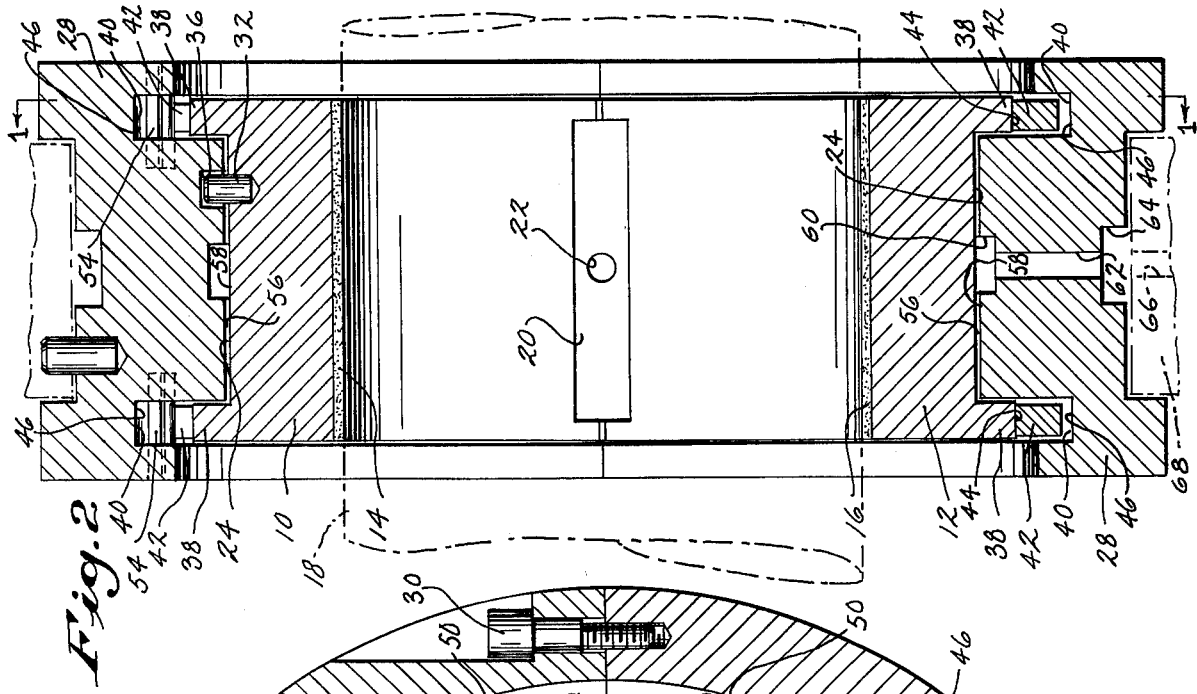
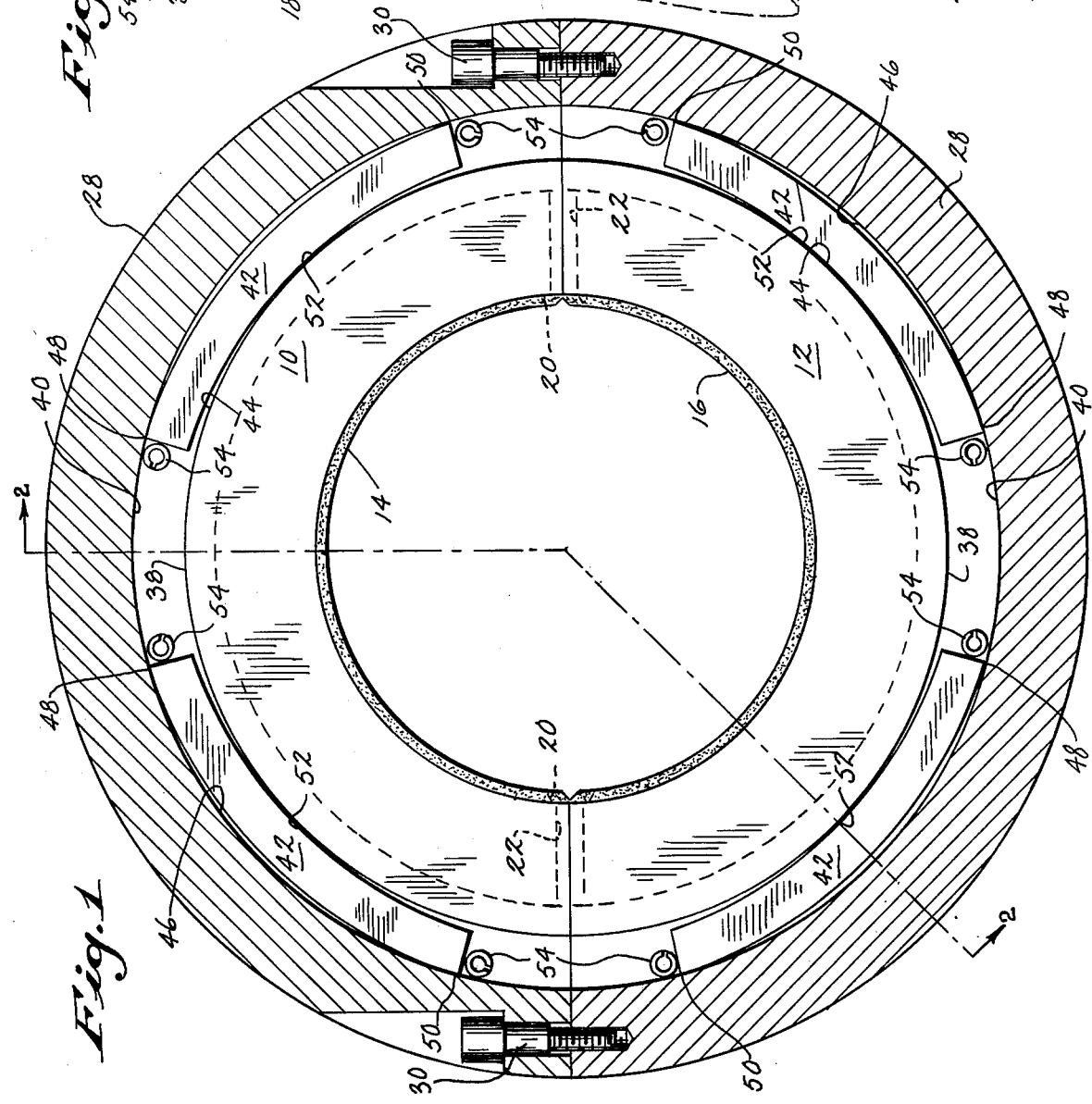

JOURNAL BEARING ASSEMBLY WITH FLEXIBLE SUPPORT AND VISCOUS DAMPING

BACKGROUND OF THE INVENTION

This invention relates to anti-vibration journal bearings such as disclosed in my prior U.S. Pat. Nos. 3,711,169 and 3,738,717. Both of these patents disclose journal bearings having bearing pads of flexible bearing material in the form of arcuate beams which provide both a bearing surface for a rotating shaft and a resilient support for cushioning vibration of the shaft. The bearing pad beams are supported at their ends between pins and normally have their central portions spaced from the housing, and oil is introduced into the said spaces to provide viscous damping for vibrations transmitted from the shaft and pads. Thus, in this prior design, all three critical functions of bearing support, flexible support, and damping support are combined in the beam type pads. Although this has distinct advantages, it severely limits the ability to design an optimum bearing assembly in which all three critical functions can be provided to the degree desired for a particular application. For example, since the beam type pads have to provide a good bearing surface in addition to being flexible, they cannot be made of steel, the latter having good spring characteristics but poor bearing characteristics. Thus, such beams of the prior art must be made of a compromise material such as bearing aluminum. However, in some applications, bearing aluminum does not have sufficient stiffness to support the vibrations, and the pads deflect to their limit; that is, they bottom out. Thus the desired flexibility is lost. This occurs at high shaft speeds where the characteristics of flexibility and damping are most urgently needed. Accordingly, for such applications there is a need for a bearing structure that permits the use of stiffer spring material while still providing an efficient bearing surface and desirable damping action.

SUMMARY OF THE INVENTION

In accordance with this invention, the foregoing problem has been solved by positioning the arcuate spring elements between a separate bearing means for the shaft and the bearing housing to thus resiliently support the bearing means within the housing. The spring elements preferably comprise flexible arcute metal beams each having an inner radius of curvature that is greater than the radius of curvature of the adjacent surface of the bearing means, and having an outer radius of curvature that is greater than the radius of curvature of the adjacent housing surface. A clearance or gap is preferably provided between adjacent surfaces of the bearing means and housing, and oil is introduced into said clearance to provide viscous damping for vibrations from the shaft and bearing means.

DESCRIPTION OF THE DRAWINGS

FIG. 1 is a cross-sectional view through a bearing housing illustrating an embodiment of the invention.

FIG. 2 is a radial sectional view taken on the line 2—2 of FIG. 1.

DESCRIPTION OF THE PREFERRED EMBODIMENT

Figure 4:
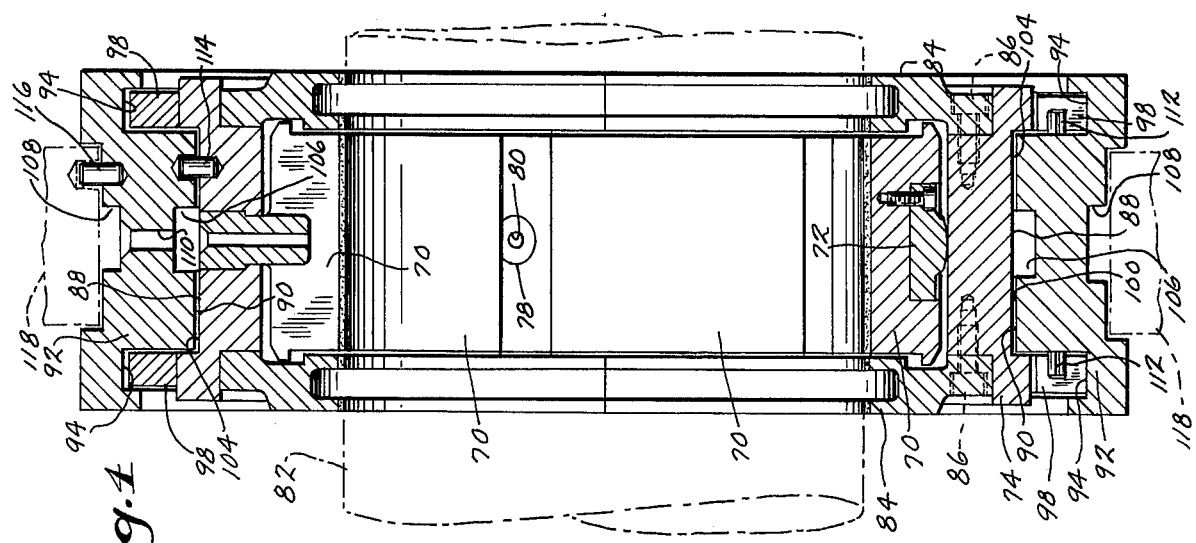
FIG. 4 is a radial sectional view taken on the line 4—4 of FIG. 3.

FIG. 1 shows the preferred embodiment of the invention used in combination with a simple two-groove sleeve type journal bearing. However, it must be emphasized that the bearing portion of the assembly may be any one of a variety of designs, such as multiple-groove, lobe type, tilting pad type, or even a ball or roller bearing. The choice will depend on the application.

Referring to FIGS. 1 and 2, the bearing means in this example includes two semi-cylindrical bearing sleeve halves 10 and 12 which are faced on their inner surfaces 14 and 16 with bearing material, and which surround the shaft 18 and rotatably support the latter. The bearing surfaces of bearing sleeve halves 10 and 12 are grooved at their parting lines to form an opposed pair of axial oil grooves 20 (FIG. 2). The bearing sleeve halves 10 and 12 are also bored midway of the length of their parting lines to form radial oil ducts 22 which open into oil grooves 20 for conducting oil to the bearing surfaces 14 and 16.

As shown in FIG. 2, bearing sleeve halves 10 and 12 have outer peripheral grooves 24 of nearly as great axial extent as the bearings, and the bearing halves are supported in a split bearing housing 28 whose halves are connected together in a conventional manner by bolts 30 (FIG. 1), the latter engaging threaded openings in one of the housing halves. Rotation of the bearing sleeve halves 10 and 12 within housing 28 is prevented by an anti-rotation pin 32 (FIG. 2) which engages a radial opening 36 in housing 28.

The outer peripheral grooves 24 in bearing sleeve halves 10 and 12 are bordered by opposed peripheral ribs or flanges 38 (FIG. 2) each of which partly fills corresponding circular edge grooves 40 in housing 28. A plurality of arcuate spring beams 42 are positioned in endwise relationship in circular edge grooves 40 to resiliently support bearing sleeve halves 10 and 12 within housing 28. Spring beams 42 are sufficiently thick and are of such material as to resist flexing unless subjected to substantial load.

Each arcuate spring beam 42 has an inner radius of curvature that is greater than the radius of curvature of the adjacent surface 44 of the bearing flange, and has an outer radius of curvature that is greater than the radius of curvature of the adjacent housing surface 46, which is the bottom of a groove 40. Thus each arcuate spring beam 42 is supported on its two outer ends 48 and 50 by the surface 46 at the bottom of the housing groove 40 and is free to flex radially in its central portion. Bearing surfaces 44 contact the inner central portion 52 of beams 42 and transmit loads and vibrations to the central portions of beams 52 to cushion the loads and vibrations.

Figure 3:
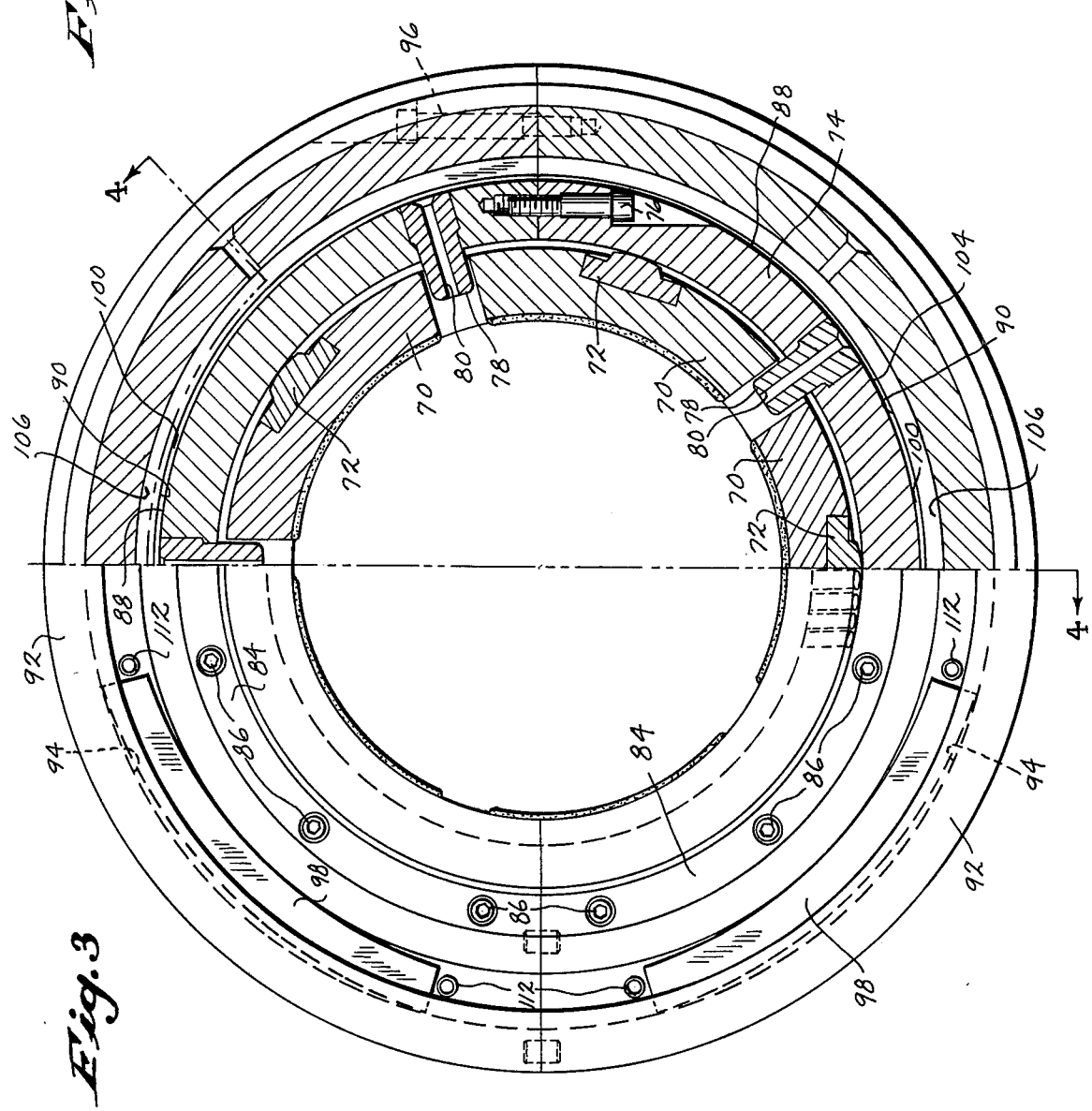
FIG. 3 is a side view, partially cut away and shown in cross-section, illustrating a modification for use with a tilting pad journal bearing.

The manner in which the above noted radii of curvature provide end support and a flexible center for beams 52 is also illustrated in FIG. 3 of my above noted U.S. Pat. No. 3,738,717 and is fully explained therein.

Since the arcuate spring beams 42 are not a part of the bearing surface in this invention, they can be formed of relatively stiff spring material such as steel to better cushion the vibrations of shaft 18 and bearing sleeve halves 10 and 12.

Circumferential movement of arcuate spring beams 42 in grooves 40 is prevented by retainer pins 54 which extend transversely of grooves 40 at the ends of the beams 42.

As shown in FIG. 2, there is normally a clearance or gap 56 between the bottoms of groove 24 and the adjacent rib surface 58 of bearing housing 28. A peripheral oil groove 60 in housing rib surface 58 and a radial oil duct 62 in housing 28 conduct oil to and from clearance 56 and also into ducts 22, which lubricates the interior of bearing sleeve halves 10 and 12. The oil in clearance 56 provides viscous damping for vibrations of bearing sleeve halves 10 and 12.

An outer oil groove 64 in housing 28, into which oil is pumped by any conventional means (not shown) through a duct 66 in supporting structure 68, serves to simultaneously provide oil in clearance 56 for damping vibrations, and to lubricate the interior of bearing sleeve halves 10 and 12.

In the foregoing embodiment of the invention, the three critical functions of bearing support, flexible support, and damping are each independent and can be individually optimized without introducing an unwanted changes into the other functions. This is an important advantage of the invention and provides a substantial improvement in the operating characteristics of the bearing.

FIGS. 3 and 4 show a modification in which the above-described embodiment is applied to a tilting pad bearing. In this modification, a plurality of tilting bearing pads 70 are tiltably supported on hardened buttons 72 around the interior of a split bearing shell 74 which is bolted together by bolts 76 (FIG. 3). Stop pins 78 containing oil feed ducts 80 extend radially through bearing shell 74 to prevent circumferential movement of pads 70 and to supply oil to the bearing in the spaces between pads 70. The oil is then distributed by rotation of shaft 82 into the spaces between shaft 82 and the bearing surfaces of pads 70. Flanking end rings 84 are connected to the sides of bearing shell 74 by bolts 86 (FIG. 4).

Bearing shell 74 has an outer peripheral groove 88 which interfits with circumferential portion 90 of an annular housing 92. The latter has axially spaced annular grooves 94, one on each side of the portion 90. Annular housing 92 is split into two halves which are held together by bolts 96 (FIG. 3). Arcuate spring beams 98, which are similar to arcuate spring beams 42 of FIG. 1, are mounted in endwise relationship in grooves 94 to resiliently support bearing shell 74 in housing 92 and cushion vibrations of bearing shell 74.

A clearance or gap 100 is provided between the adjacent surfaces 88 and 104 of bearing shell 74 and housing 92, respectively. Peripheral oil grooves 106 and 108 are connected by radial ducts 110 in housing 92 to conduct oil into clearance 100 and into the interior of the bearing. The oil in clearance 100 provides viscous damping for vibrations of bearing shell 74.

Retaining pins 112 project into grooves 94 at the ends of arcuate spring beams 98 to prevent circumferential movement. Anti-rotation pins 114 and 116 are mounted in matching openings in bearing shell 74, housing 92, and bearing support 118 to prevent rotation of bearing shell 74 and housing 92.

Various changes and modifications may be made without departing from the spirit of the invention, and all of such changes are contemplated as may come within the scope of the following claims.

What I claim is:

1. An anti-vibration journal bearing with flexible support and viscous damping characteristics and in which the flexible support function is provided separately from the viscous damping function, said bearing comprising annular bearing means for rotatably supporting a shaft, an annular bearing housing surrounding said annular bearing means, means for holding said annular bearing means and said annular bearing housing against relative rotation, a variable clearance space between certain adjacent annular surfaces of said bearing means and housing, and means for introducing oil into said clearance space to provide viscous damping for said bearing means, and spring elements physically separate from the annular bearing means and positioned between certain adjacent other annular surfaces of said annular bearing means and said annular housing for resiliently supporting said annular bearing means within said housing.

2. The bearing of claim 1 wherein said spring elements comprise flexible metal beams positioned in endwise relationship between said bearing means and said housing, each of said beams being arcuate in shape in unassembled condition and being sufficiently thick and of such material as to resist flexing unless subjected to a substantial load, each beam maintaining its unassembled arcuate shape unless subjected to such load, each beam having an inner radius of curvature that is greater than the radius of curvature of the adjacent surface of the annular bearing means and having an outer radius of curvature that is greater than the radius of curvature of the adjacent surface of the annular housing.

3. The bearing of claim 1 wherein there is at least one annular groove in said bearing housing accommodating said spring elements.

4. The bearing of claim 3 and further comprising retainer pins projecting into said groove at the ends of said spring elements to limit circumferential movement.

5. The bearing of claim 1 wherein there are two axially spaced annular grooves, each accommodating spring elements.

6. The bearing of claim 1 wherein the means for introducing oil into the clearance space includes an oil groove in the inner periphery of said annular housing and at least one radial oil duct extending through said housing and communicating with said oil groove.

7. The bearing of claim 6 wherein said clearance is between the inner periphery of said housing and the adjacent surface of said bearing means.

8. The bearing of claim 7 and further comprising an oil duct in said bearing means communicating with said oil groove in said housing for directing oil therefrom to the interior of said bearing means.

9. The bearing of claim 1 in which said annular bearing means has an axially extending groove in its periphery, said annular bearing housing having a complementary rib received in said groove, said groove and rib constituting the surfaces bounding said clearance space, said annular bearing housing having a groove and said annular bearing means having a rib between which said spring elements are positioned.

* * * * *